Patented Aug. 9, 1932

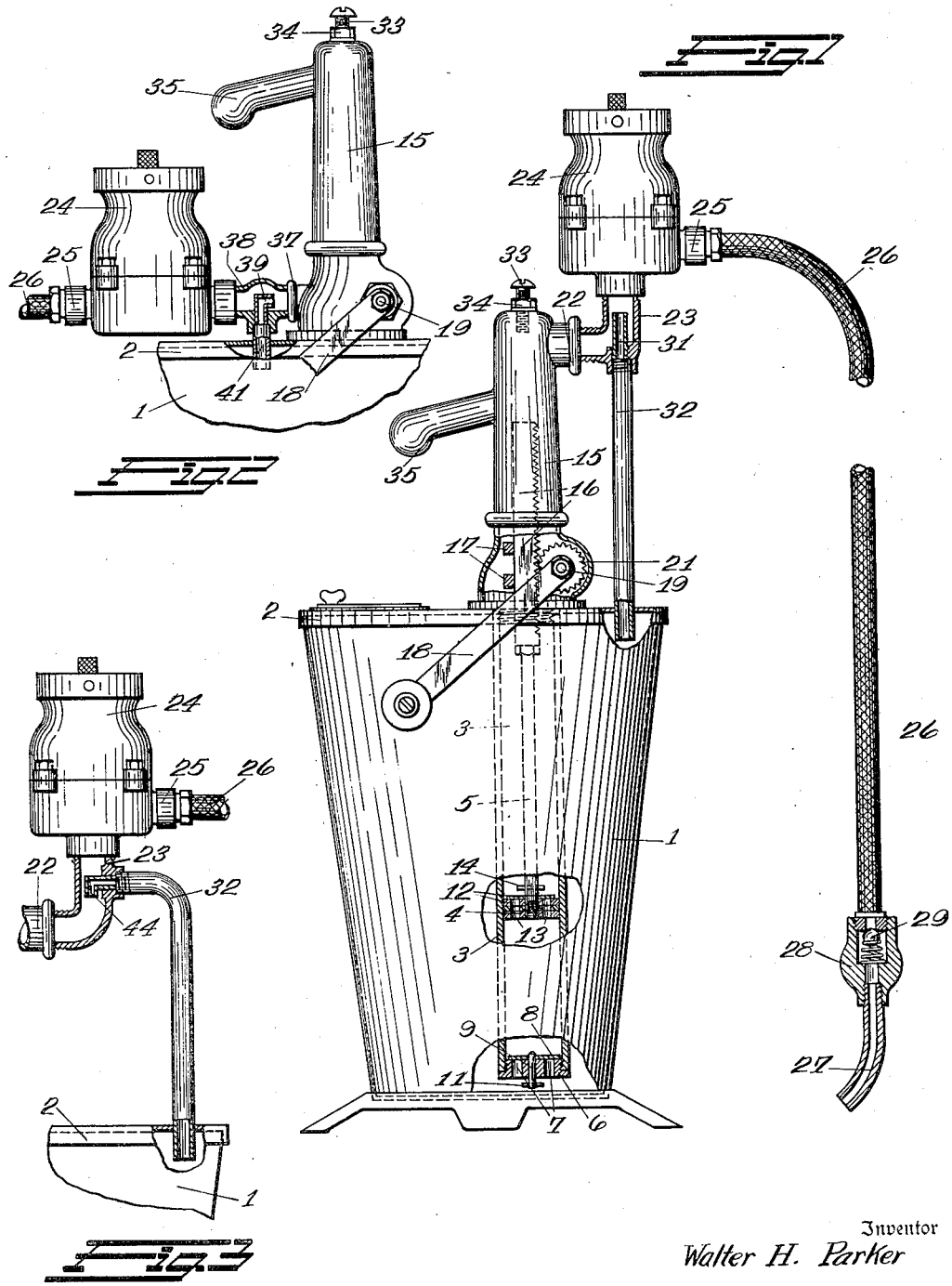

1,871,128

UNITED STATES PATENT OFFICE

WALTER H. PARKER, OF PITTSBURGH, PENNSYLVANIA, ASSIGNOR TO PITTSBURGH EQUITABLE METER COMPANY, OF PITTSBURGH, PENNSYLVANIA, A CORPORATION OF PENNSYLVANIA

PUMPING APPARATUS

Application filed December 21, 1931. Serial No. 582,399.

This invention relates to a novel pumping apparatus for fluids and is particularly designed for dispensing viscous liquids such as grease, or heavy lubricating oil, although the apparatus is not so limited.

Various mechanisms have been designed for dispensing heavy fluids such as the grease used in the transmission casings and differential casings of automobiles, with a view to measuring the quantity of fluid dispensed. Attempts have been made to accurately measure the quantity of fluid passing through the dispensing apparatus, but the mechanisms for so measuring have not been entirely satisfactory. In some forms of apparatus a reciprocating piston works in a cylinder and is designed to hold a specified quantity of fluid so that one complete reciprocation of the piston will theoretically deliver a definite quantity of fluid. Such apparatus is not accurate in its measurement, since in many instances gas or air is sucked into the cylinder with the fluid and no indication is made of the relative quantities of gas or air and fluid dispensed.

In other forms of apparatus a simple displacement meter has been associated with the dispensing pump so that the grease or other fluid registers on the meter. However, this apparatus is also subject to the fault, that gas or air may pass through the meter and cause registration thereon in the same manner as if the fluid were being passed. To prevent this inaccurate registration and consequent over-charging of the customers, the weights and measuring authorities have adopted stringent regulations requiring mechanisms which will exactly register the quantity of fluid dispensed within close limits. Some of these regulations require some means to prevent the passage of fluid through the meter when the level of fluid in the container reaches such a point that air may be sucked into the pump with the fluid.

One object of this invention therefore is to provide a pumping apparatus for use with fluids in which the quantity of fluid dispensed is accurately measured.

Another object of this invention is to provide a dispensing and measuring apparatus for viscous fluids such as grease or the like, wherein the quantity of fluid passing to the customer is accurately measured and any entrained gas or air is prevented from registering on the meter in appreciable quantities.

Another object of this invention is to provide measuring and pumping apparatus of the above described character wherein a pump is associated with a stationary or portable container for the fluid, and wherein dispensing may continue until the container is substantially empty, since the gas or air which will necessarily be mixed with the grease when the level of the liquid gets low in the container will be automatically eliminated and will not register on the meter.

Another object of the present invention is to provide a dispensing and measuring apparatus for viscous fluids such as grease or oil in which any gas or air entrained with the fluid is automatically by-passed around the meter and is prevented from registering thereon.

Another object of this invention is to provide a pumping and dispensing apparatus for viscous fluids including a by-pass for the gas or air which otherwise would register on the meter, and so arranged that dispensing and accurate measurement may continue even when air or gas is mixed with the fluid. This object is accomplished by the provision of a by-pass communicating with the dispensing line ahead of the registering meter in such a way that substantially all free air entrained with the fluid is automatically eliminated and the fluid alone is passed on through the meter.

These and other objects of the present invention will be apparent from the following description and the appended claims when taken in connection with the accompanying drawing wherein Figure 1 is a side elevation partly in section showing one embodiment of the invention.

Figure 2 is a broken elevation partly in section showing a slight modification.

Figure 3 is a broken elevation partly in section of a further modification.

Referring to the drawing wherein like parts are designated by like reference characters the fluid to be dispensed such as heavy grease or oil is contained within a portable container 1 having a detachable cover 2, said cover having openings whereby fluid may be put into the container 1 and dispensed therefrom. Mounted on the cover 2 and extending downwardly into the container to a point adjacent the bottom thereof is a pump cylinder 3 in which reciprocates the piston 4 secured to the piston rod 5. The lower end of the cylinder 3 is provided with a plug 6 having a plurality of holes 7 therethrough. An inlet check valve 8 is positioned within the cylinder and above the openings 7, the valve 8 having rod 9 extending downwardly through the plug 6 and being provided with a cross pin 11 at the lower end thereof.

The piston 4 is also provided with a check valve 12 which may slide on the piston rod 5 and is adapted to cover and uncover the openings 13 through the piston 4. A cross pin 14 limits the upward movement of check valve 12.

The cover 2 has an enlarged opening in alignment with the cylinder 3 and has secured over said opening the pump top housing 15. Housing 15 is hollow and extends upwardly a sufficient distance to allow reciprocation of a rack 16 which is secured to the upper end of piston rod 5. Rack 16 is guided in the casting 15 by spaced bearings 17. Housing 15 is preferably a unitary casting but may be otherwise made.

To reciprocate the piston rod 5 and the piston 4, a handle member 18 is secured to shaft 19 projecting from the housing 15. The shaft 19 has suitably secured thereto within the housing 15 a pinion 21 in engagement with the rack teeth of the rack 16.

When it is desired to dispense liquid from a container 1 the handle 18 is rotated so that the pinion 21 causes the rack 16 to move upwardly within the housing 15. Pressure of air or grease above the piston 4 causes the valve 12 to be closed and the resultant vacuum opens the inwardly opening valve 8 so that grease is sucked into the lower end of the cylinder. After a full stroke of the piston, the rotation of handle 18 is reversed and the piston moves downwardly. During this movement the lower check valve 8 is closed by the pressure of the grease, and the check valve 12 on the piston 4 opens, so that the grease trapped in the lower end of the cylinder 3 is forced above the piston 4. Upon the next reciprocation of the piston this grease passes upwardly into the housing 15 to the dispensing line to be now described.

The upper end of housing 15 is provided with a threaded aperture 22 for the reception of a threaded nipple of a short elbow conduit and by-pass connection 23. Connection 23 is adapted to be threaded into the inlet of and to support a registering displacement meter 24, the outlet 25 of which is connected with a dispensing hose 26. Hose 26 at the opposite end has a nozzle 27 secured in a fitting 28 which is mounted on the end of the hose. A ball check valve 29 is mounted in fitting 28 to prevent the flow of grease by gravity and to also prevent the leakage of grease under the slight pressures developed when air is being by-passed around the meter as hereinafter described.

The conduit 23 has a bend therein at which is a downwardly directed opening having a short tube 31 removably secured therein by screw threads. Tube 31 extends upwardly into the vertical portion of the conduit 23 as seen in Figure 1. A conduit 32 is movably secured to the bottom of the elbow conduit 23 and extends downwardly through the cover 2 of the dispensing container 1 and communicates with the air above the liquid level in the container.

An adjustable stop 33 is threaded through the upper end of housing 15 and may be locked in position by locknut 34. This stop is adapted to engage the upper end of rack member 16 to regulate the travel of piston 4. The housing 15 is furthermore provided with a handle member 35 projecting to one side whereby the operator may grasp the handle with one hand and the crank or operating handle 18 with the other hand. The meter 24 may be provided with indicia designating any desired quantity of fluid passed such as pints or pounds.

The operation of this embodiment of the invention is as follows: When the handle 18 is rotated to force fluid upwardly through housing 15, the fluid passes through nipple 22, conduit 23, meter 24, dispensing hose 26 and out of the nozzle 27, forcing the ball valve 29 from its seat. The passage of fluid through meter 24 causes registration thereon. When, due to the fact that the level of liquid in container 1 is low, or for any other cause, air is drawn into the cylinder 3 and passes upwardly, such air will not enter the meter 24 but will take the easiest path and return through the by-pass provided by tube 31 and conduit 32 back to container 1. During normal dispensing operations it will be understood that a certain amount of the fluid is also being by-passed through tube 31 and conduit 32 back into the container 1. However, due to the fact that the area of the by-pass is materially smaller than the area of the main conduit, the amount of grease returned to the container 1 does not interfere with the operation of the device. The by-pass conduit is large enough to by-pass the full air capacity of the pump without allowing pressure to be built up in sufficient magnitude to operate the meter, and yet the grease passing through the by-pass is limited to a small portion of the total grease passing into the housing 15. It will be understood that the cover 2 of the container is vented to atmosphere to prevent the formation of a partial vacuum therein during operation of the pumping apparatus, as is usual in such constructions. The air which is by-passed back into the container is therefore vented to atmosphere through this normal vent.

A novel and important feature of the by-pass as herein shown is the introduction of the vertical tube 31 into the center of the flowing mass of grease or liquid. I have found that when a mixture of air and grease, oil, or other fluid is passing through the conduit that the globules of air are usually positioned within the mass of flowing liquid and out of contact with the walls thereof. This is probably due to the fact that air follows the line of least resistance which in the present case is the center of the mass of flowing fluid. The novel construction herein shown takes advantage of this fact and the vertical by-pass conduit 31 projects substantially into the center of the mass of flowing liquid to thereby most effectively eliminate entrained air.

In the embodiment of the invention shown in Figure 2, wherein like reference characters designate like parts, the meter 24 is arranged adjacent the top of the container, and the by-pass is so arranged that the opening thereof faces the direction of flow of the fluid. In this embodiment of the invention, the casting 15 has a nipple 37 adjacent the bottom thereof to which is secured the short conduit 38 which is connected at its opposite end to the meter 24. Projecting upwardly into the short conduit 38 is the by-pass tube 39 which is provided with a right angle portion so that the open end thereof faces the flow of liquid and is positioned substantially centrally of said flow. The open end of the by-pass tube 39 connects with the short conduit 41 leading back into the container 1.

The operation of this form of my invention is substantially as previously described. However, in this form the forwardly moving air or gas directly impinges against the open end of by-pass tube 39 and is easily eliminated and passes back into the container 1. In this form of the invention as well as in the embodiment previously described, the positioning of the by-pass conduit substantially centrally of the forwardly moving liquid effectively eliminates air or gas and prevents registration thereof on the meter 24.

With the present invention, it is possible to operate the dispensing apparatus until the container 1 is substantially entirely empty, since even though some air is drawn into the dispensing flow line with the liquid or grease, the air is automatically eliminated. Therefore when the level of the grease gets low, dispensing can continue until the container is substantially empty, a feature which is not possible in prior constructions.

Although the present invention has been specifically described as applied to a dispensing apparatus and one particularly adapted for the dispensing of greases or heavy oils, it will be understood that it is not so limited. The arrangement of the by-pass as shown may be useful in many other places where it is desirable to eliminate air or gas from any fluid.

It will be noted that by-pass tubes 31 and 39 are removably secured in position, so that other sizes may be substituted, in acordance with the viscosity of fluid being dispensed.

Figure 3 shows a further form wherein the by-pass tube 44 projects into the conduit 23 just beyond the bend and has an open end facing the flow of fluid substantially centrally thereof. Thus entrapped air or gas directly impinges against the open end of the by-pass and since the air or gas follows the center of the flowing liquid, an effective elimination thereof is obtained.

It will be understood that the present invention is not limited to any specific form of pumping apparatus, as any suitable means may be used to force fluid out of the container.

The construction herein described is inexpensive to manufacture and effective in operation. It will be noted that the short conduit section 23 serves as a combined meter support and by-pass support and that extra pipes or conduits are unnecessary. The various parts are readily assembled and disassembled for repairs and adjustments.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Leters Patent is:

1. A dispensing and measuring apparatus for viscous substances, such as grease, comprising a container for the grease, a pump, a meter, a discharge line, and a discharge nozzle mounted upon said container and connected together so that upon actuation of said pump grease will flow from said container through said meter discharge line and nozzle in succession, a valve adjacent said nozzle mounted to move in a direction opposite to the direction of flow of grease therethrough, spring means to automatically seat said valve and prevent flow of grease from said nozzle when said pump is not in operation and to impose a resistance to the free flow grease through the meter and nozzle upon actuation of said pump, and a bypass having its outlet opening into said container above the level of grease therein and its inlet between said pump and meter, the resistance of said spring means causing air entrained in the stream of grease to be returned to said container above the level of grease therein without entering said meter.

2. The combination defined in claim 1 in which said bypass is arranged at its inlet end to open into the stream of grease at the central portion thereof and in a direction substantially opposite to the direction of normal flow of said stream.

3. A dispensing and measuring apparatus for viscous substances, such as grease, comprising a container for the grease, a pump having its inlet below the level of grease in said container and its outlet connected to a meter, a discharge line, and a discharge nozzle, said pump, meter, discharge line and nozzle being mounted upon said container and connected together so that upon actuation of said pump grease will flow from said container through said meter, discharge line and nozzle in succession, and a bypass having its outlet in said container above the level of grease therein so as to be remote from the inlet to said pump and so that the grease within the container does not obstruct said outlet and having its inlet in the path of the grease between said pump and meter so that air entrained in the stream of grease will be returned to said container above the grease therein.

4. The combination defined in claim 3 in which said bypass at its inlet end is arranged to open into the stream of grease at the central portion thereof and in a direction substantially opposite to the direction of normal flow of said stream.

In testimony whereof I affix my signature.

WALTER H. PARKER.